May 19, 1970     V. I. MATRANGA     3,512,863

REFLECTING STEREOSCOPIC VIEWER

Filed Feb. 26, 1969

INVENTOR
VINCENT I. MATRANGA
BY
ATTORNEY

United States Patent Office 3,512,863
Patented May 19, 1970

3,512,863
REFLECTING STEREOSCOPIC VIEWER
Vincent I. Matranga, 22 Amity St.,
Elizabeth, N.J. 07202
Filed Feb. 26, 1969, Ser. No. 802,574
Int. Cl. G02b 27/24
U.S. Cl. 350—137                                1 Claim

ABSTRACT OF THE DISCLOSURE

A reflecting stereoscopic viewer for presenting a separate image to each eye of an observer comprising a housing. An open frame is adjustably and centrally mounted on the base of said housing and a pair of abutting mirrors, arranged at an obtuse angle with respect to each other, in horizontal alignment, are adjustably and centrally mounted in the frame with their back portions slightly depressed. A second open frame is mounted in the housing above and rearwardly of the first frame, and a pair of larger spaced mirrors is mounted therein in parallel relation to the first pair of mirrors but with their back portions slightly raised. A flat support for a pair of stereoscopic pictures is mounted behind the first frame and in tilting relation to the base. A viewing panel is angularly mounted between the housing sides above the first frame.

BACKGROUND OF THE INVENTION

Reflecting stereoptic instruments have been known for many years. For example, Pat. 1,840,878 describes a reflecting stereoscope wherein the viewer looks down through a lens with both eyes upon a pair of mirrors mounted at right angles to each other. Each eye looks into its respective mirror, and each reflection is passed through a lens to a larger mirror mounted in parallel horizontal arrangement with the first mirror. The reflection from the larger mirror then is passed down through another lens to a photograph laid flat on the table. Since the two stereo photographs were taken from the same location, but at slightly different horizontal angles, a stereoscopic or 3-dimensional image is seen with both eyes. First of all, such an assembly requires considerable space in the horizontal direction. Secondly, the primary pair of mirrors are in spaced relation so that an indistinct image is obtained. Thirdly, the latter mirrors are at an angle of 90°, which reduces the size of the image considerably. Furthermore, the entire assembly is readily subject to breakage and misadjustment.

Pat. No. 2,883,907 also employs lenses and the secondary mirrors are mounted in lateral alignment with the spaced primary mirrors. Pat. No. 933,844 uses mirrors at right angles to each other and varies considerably from the present invention. Pat. No. 2,845,844 also is similar in nature, and is a hand-held instrument.

SUMMARY OF THE INVENTION

According to the present invention, a compact reflecting stereoscopic viewer is presented wherein the pairs of mirrors, disposed at obtuse angles to each other, are mounted in separate pairs in movable frames, so that proper adjustment will not be altered by removal of a frame. Also, the viewing at the first pair of abutting mirrors is done at an angle, with the reflection being projected, from a pair of spaced mirrors disposed above the first frame holding the spaced mirrors. The stereoscopic pictures to be viewed are placed on a platform which is tilted with respect to the base, whereby a clear 3-dimensional image is presented to the person doing the viewing.

BRIEF DESCRIPTION OF THE DRAWINGS

The invention will be more readily understood by reference to the accompanying drawing in which a preferred embodiment is described, and in which.

The same numerals refer to similar parts in the various figures.

DESCRIPTION OF THE PREFERRED EMBODIMENTS

Figure 1:
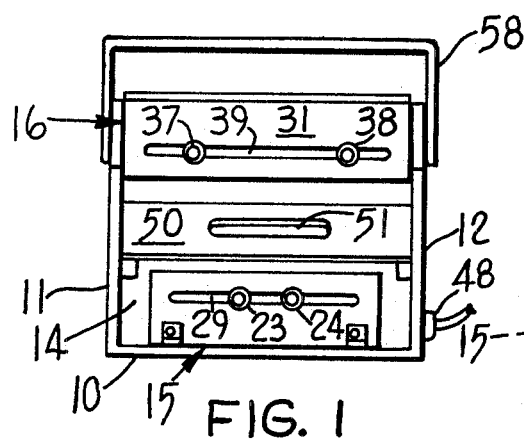
FIG. 1 presents a front elevational view of a preferred embodiment of the invention.

Referring to the drawing, numeral 10 indicates a flat base onto which are attached the sides 11 and 12 and back 13. The front has an open space 14 into which is inserted the lower mirror pair mounting, indicated generally as 15. This mounting comprises an open frame having a front 17, sides 18 and 19 and back 20. Mirrors 21 and 22 are mounted on front pivots 23 and 24, respectively, riding in slot 29, and rear pivots 25 and 26, respectively, riding in slot 30. These pivots provide for independent lateral and vertical adjustments for each mirror. Frame 15 also is mounted on base 10 by means of adjustable angle members 27 and 28, which enable lateral adjustment of the frame 15 on base 10.

Mounted on sides 11–12, and above frame 15, is a second frame, indicated generally as 16. The latter frame also has front 31, sides 32 and 33, and back 34. Larger mirrors 35 and 36 are mounted on the front 31 on pivots 37 and 38, respectively, riding in slot 39, and they are mounted on back 34 on pivots 40 and 41, respectively, riding in slot 42. The latter four pivots also provide lateral and vertical adjustments for mirrors 35 and 36.

Disposed behind frame 15 is a flat support 43 having its lower end attached to base 10. Support 43 is tilted vertically and its sides are attached to sides 11–12. It serves to hold stereoptic pictures 44 and 45.

The unit has a top 46 which extends over the open upper portion 47 of the back. Under extension 48 is light 49 which serves to illuminate pictures 44–45 through open back space 47.

Figure 4:
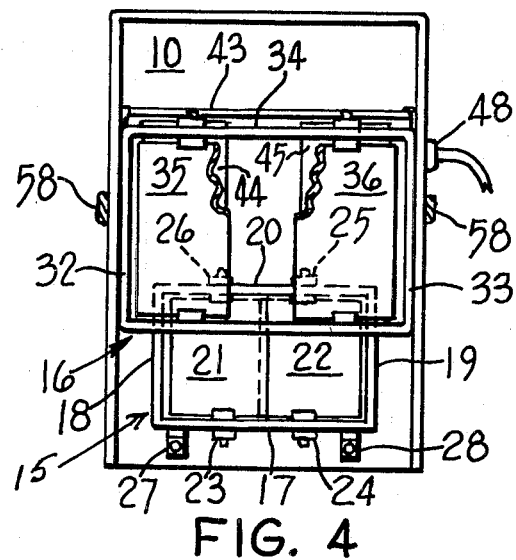
FIG. 4 shows a top view thereof with cover panels removed to expose the mirror and picture mountings, and corners of the larger mirrors cut away, to expose the stereoscopic pictures viewed.

A tilted panel 50 is mounted between sides 11–12 in the open front portion of the unit. It is provided with a viewing opening 51 through which the viewer looks, at a downward angle, at mirrors 21–22. In FIG. 4, panels 50 and 46 are removed, and handle 58 is cut away. An electric plug 48 is provided to supply current to lamp 49.

Figure 2:
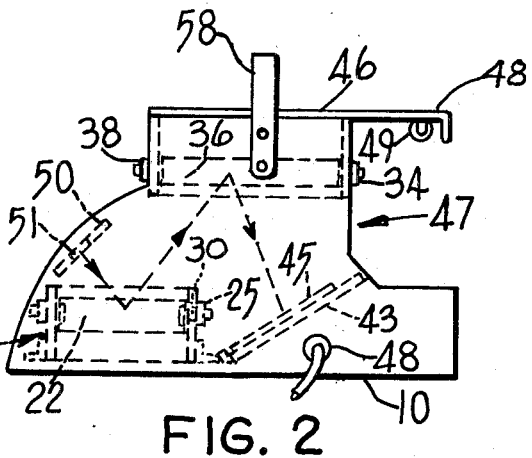
FIG. 2 depicts a side elevational view of the unit shown in FIG. 1.
Figure 3:
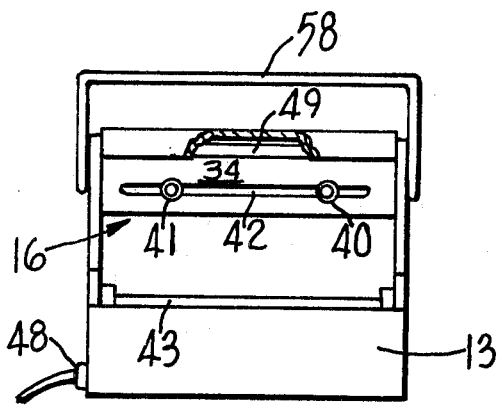
FIG. 3 illustrates a rear elevational view thereof, with a portion of the reflector cut away to expose the light source.
Figure 5:
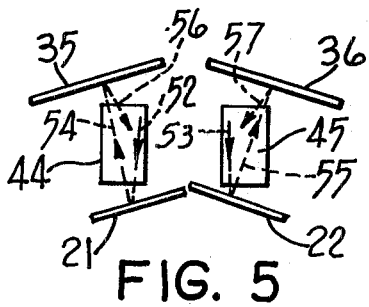
FIG. 5 presents a diagrammatic front view of the mirror and picture arrangement within the unit.

As can be followed from FIGS. 2 and 5, the two eyes of the viewer looking through opening 51 look along line 52 (left eye) and 53 (right eye) upon the overlapped pair of mirrors 21–22 which are set at an obtuse angle to each other, desirably at an angle of about 135° to about 170°. These mirrors also have their back portions tilted slighlty downwardly so as to catch the reflections along lines 54 and 55, respectively, from larger spaced mirrors 35 and 36. The latter pair of mirrors are mounted in parallel relation to mirrors 21 and 22, respectively, but their back portions are raised slightly so as to catch images, along lines 56 and 57, respectively, of stereoptic pictures 44 and 45, respectively, whereupon a 3-dimensional single image is observed through opening 51. Support 43 is set at angle of about 35° to about 40° with respect to base 10.

I claim:
1. A reflecting stereoscopic viewer, comprising:
   a housing having a flat base, sides and an open front,
   an open first frame adjustably and centrally mounted on the forward portion of said base within said open front,
   a pair of abutting mirrors centrally and adjustably mounted within said frame at an obtuse angle of about 135° to about 170° with respect to each other in horizontal arrangement and with their back portions tilted downwardly slightly,
   a second open frame disposed above and somewhat rearwardly with respect to said first frame in optical alignment therewith and mounted between said sides,
   a pair of spaced larger mirrors centrally and adjustably mounted within said second frame in parallel relation with respect to said abutting mirrors and in optical alignment therewith, and with their back portions raised slightly,
   a flat support in optical alignment with both pairs of said mirrors for holding a pair of stereoscopic pictures, and mounted between said sides and behind said first frame vertically tilted at an angle of about 35° to about 40° with respect to said base and with its lower forward end disposed on said base,
   illuminating means mounted in said viewer and optically aligned with said support for illuminating stereoscopic pictures thereon,
   a panel angularly mounted between said sides above said first frame and having a centrally disposed viewing opening for viewing, at a downward angle, with both eyes, said abutting mirrors, and
   said mirrors being relatively adjustable in such a manner that the image from each of the stereoscopic pictures on said support is reflected by said spaced mirrors to said abutting mirrors to present separate views to the observer whereby a three-dimensional image is seen through said opening.

References Cited

UNITED STATES PATENTS

| | | | |
|---|---|---|---|
| 933,844 | 9/1909 | Kellner | 350—138 |
| 1,840,878 | 1/1932 | Abrams | 350—137 |
| 2,845,844 | 8/1958 | Vierling | 350—137 |
| 2,883,907 | 4/1959 | Silent | 350—138 |

PAUL R. GILLIAM, Primary Examiner